US007082204B2

(12) United States Patent
Gustavsson

(10) Patent No.: US 7,082,204 B2
(45) Date of Patent: Jul. 25, 2006

(54) ELECTRONIC DEVICES, METHODS OF OPERATING THE SAME, AND COMPUTER PROGRAM PRODUCTS FOR DETECTING NOISE IN A SIGNAL BASED ON A COMBINATION OF SPATIAL CORRELATION AND TIME CORRELATION

(75) Inventor: Stefan Gustavsson, Helsingborg (SE)

(73) Assignee: Sony Ericsson Mobile Communications AB (SE)

( * ) Notice: Subject to any disclaimer, the term of this patent is extended or adjusted under 35 U.S.C. 154(b) by 629 days.

(21) Appl. No.: 10/295,698

(22) Filed: Nov. 15, 2002

(65) Prior Publication Data

US 2004/0008850 A1 Jan. 15, 2004

Related U.S. Application Data

(60) Provisional application No. 60/395,889, filed on Jul. 15, 2002, provisional application No. 60/395,888, filed on Jul. 15, 2002.

(51) Int. Cl.
*H04R 3/00* (2006.01)
*H04R 25/00* (2006.01)
*H04B 15/00* (2006.01)

(52) U.S. Cl. ........................ 381/92; 381/94.1; 381/317

(58) Field of Classification Search ................ 381/317, 381/318, 92, 94.1, 94.2, 94.3, 95
See application file for complete search history.

(56) References Cited

U.S. PATENT DOCUMENTS

| | | | | |
|---|---|---|---|---|
| 5,347,586 | A * | 9/1994 | Hill et al. | 381/71.8 |
| 5,400,409 | A * | 3/1995 | Linhard | 381/92 |
| 6,219,427 | B1 * | 4/2001 | Kates et al. | 381/318 |
| 6,675,114 | B1 * | 1/2004 | Ando et al. | 702/75 |
| 2002/0337088 | | 3/2002 | Dickel et al. | 381/317 |
| 2002/0041696 | A1 | 4/2002 | Jensen | |

FOREIGN PATENT DOCUMENTS

| | | |
|---|---|---|
| DE | 10045197 | 3/2002 |
| EP | 1 196 009 A2 | 4/2002 |
| WO | WO 99/60822 | 11/1999 |
| WO | WO 03/59010 A1 | 7/2003 |

OTHER PUBLICATIONS

International Search Report, PCT/EP03/06470, Sep. 17, 2003.

* cited by examiner

*Primary Examiner*—Xu Mei
*Assistant Examiner*—Douglas Suthers
(74) *Attorney, Agent, or Firm*—Myers Bigel Sibley & Sajovec, P.A.

(57) ABSTRACT

Noise, such as wind noise, for example, may be detected in an electronic device by generating first and second microphone signals. Cross correlation coefficients are determined for the first and the second microphone signals and autocorrelation coefficients are determined for the first and second microphone signals, respectively. A determination may be made with regard to the presence of a noise component in at least one of the microphone signals based on the cross correlation coefficients, the first autocorrelation coefficients, and the second autocorrelation coefficients.

25 Claims, 3 Drawing Sheets

ELECTRONIC DEVICES, METHODS OF OPERATING THE SAME, AND COMPUTER PROGRAM PRODUCTS FOR DETECTING NOISE IN A SIGNAL BASED ON A COMBINATION OF SPATIAL CORRELATION AND TIME CORRELATION

RELATED APPLICATION

This application claims the benefit of Provisional Application Nos. 60/395,889 and 60/395,888, filed Jul. 15, 2002, the disclosures of which are hereby incorporated herein by reference.

BACKGROUND OF THE INVENTION

The present invention relates to signal processing technology, and, more particularly, to methods, electronic devices, and computer program products for detecting noise in a signal.

Wind noise may be picked up by microphones used in such devices as mobile terminals and hearing aids, for example, and may be a source of interference for a desired audio signal. Electronic devices may incorporate adaptively directional microphones to reduce the effect of wind noise. More specifically, an electronic device may adjust the directivity pattern created by its microphones based on whether the electronic device is operating in a wind mode or no-wind mode.

Conventionally, as described in U.S. Patent Application Publication U.S. 2002/0037088 by Dickel et al., the disclosure of which is hereby incorporated herein by reference, a windy condition is detected by analyzing the output signals of at least two microphones. In more detail, one output signal is subtracted from the other to remove a common component of the two signals. The result of the subtraction is averaged and compared with a threshold value. If the threshold value is exceeded, then the device switches to a wind mode due to the wind being generally spatially uncorrelated. Unfortunately, the foregoing approach to detecting wind noise generally is more effective when turbulence near the microphones is large. For some wind angles, however, the turbulence may be relatively small. Other noise sources that are uncorrelated or inverse correlated to each other in space may generate a false windy condition.

SUMMARY OF THE INVENTION

According to some embodiments of the present invention, noise, such as wind noise, for example, may be detected in an electronic device by generating first and second microphone signals. Cross correlation coefficients are determined for the first and the second microphone signals and autocorrelation coefficients are determined for the first and second microphone signals, respectively. A determination may be made whether at least one of the microphone signals includes a noise component based on the cross correlation coefficients, the first autocorrelation coefficients, and the second autocorrelation coefficients. Embodiments of the present invention use the properties that wind noise is relatively uncorrelated in space, but relatively correlated in time. These two properties may be represented by cross correlation coefficients for multiple microphone signals and autocorrelation coefficients for the individual microphone signals, respectively. By combining both a cross correlation coefficient analysis and an autocorrelation coefficient analysis, embodiments of the present invention may detect wind noise with generally improved reliability because the determination is less sensitive to the physics of the microphones.

In other embodiments of the present invention, the directivity pattern created by the first and the second microphones is adjusted based on whether a noise component is detected.

In still other embodiments of the present invention, the cross correlation coefficients are summed to generate a spatial correlation sum, the first autocorrelation coefficients are summed to generate a first autocorrelation sum, and the second autocorrelation coefficients are summed to generate a second autocorrelation sum. The first autocorrelation sum and the spatial correlation sum are multiplied together to generate a first correlation product and the second autocorrelation sum and the spatial correlation sum are multiplied together to generate a second correlation product. A determination is made whether at least one of the microphone signals includes a noise component based on the first and second correlation products.

In further embodiments of the present invention, the first and second correlation products are compared with a threshold value and a determination is made whether at least one of the microphone signals includes a noise component based on at least one of the comparisons.

In still further embodiments of the present invention, the cross correlation coefficients may be scaled and filtered before the spatial correlation sum is generated. The first and second autocorrelation coefficients may be inverted, scaled, and filtered before generating the first and second autocorrelation sums.

Although described above primarily with respect to method aspects of the present invention, it will be understood that the present invention may be embodied as methods, electronic devices, and/or computer program products.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

Figure 1:
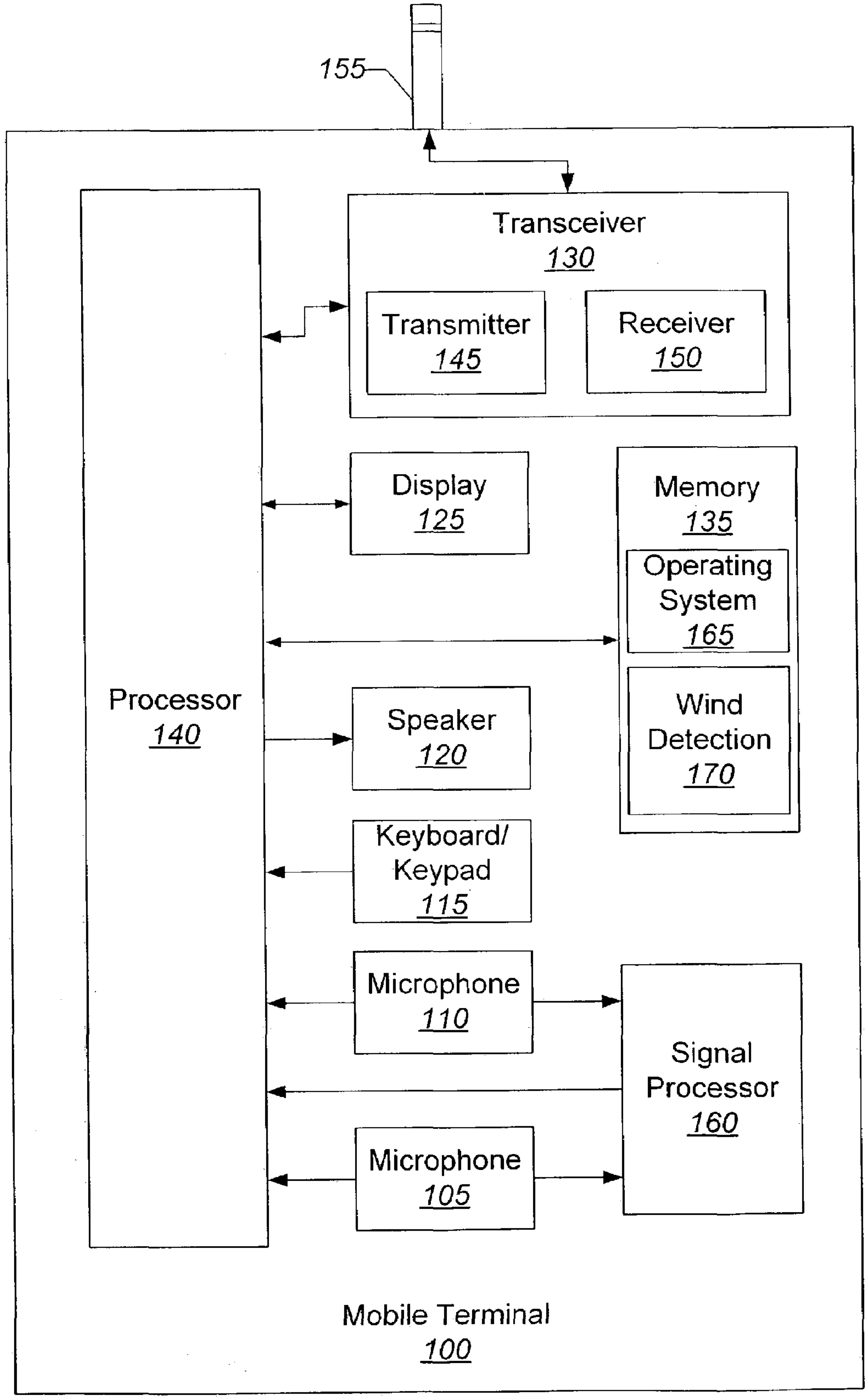
FIG. 1 is a block diagram that illustrates a mobile terminal in accordance with embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof.

The present invention may be embodied as methods, electronic devices, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The present invention is described herein in the context of detecting wind noise in a mobile terminal. It will be understood, however, that the present invention may be embodied in other types of electronic devices that incorporate multiple microphones, such as, for example automobile speech recognition systems, hearing aids, etc. Moreover, as used herein, the term "mobile terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

It should be further understood that the present invention is not limited to detecting wind noise. In general, the present invention may be used to detect noise that is relatively uncorrelated in space, but relatively correlated in time.

Referring now to FIG. 1, an exemplary mobile terminal 100, in accordance with some embodiments of the present invention, comprises at least two microphones 105 and 110, a keyboard/keypad 115, a speaker 120, a display 125, a transceiver 130, and a memory 135 that communicate with a processor 140. The transceiver 130 comprises a transmitter circuit 145 and a receiver circuit 150, which respectively transmit outgoing radio frequency signals to base station transceivers and receive incoming radio frequency signals from the base station transceivers via an antenna 155. The radio frequency signals transmitted between the mobile terminal 100 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The foregoing components of the mobile terminal 100 may be included in many conventional mobile terminals and their functionality is generally known to those skilled in the art.

The processor 140 communicates with the memory 135 via an address/data bus. The processor 140 may be, for example, a commercially available or custom microprocessor. The memory 135 is representative of the one or more memory devices containing the software and data used to determine achievable data rate estimates, which may be communicated to a radio packet data system access network for use in allocating bandwidth in the radio packet data system, in accordance with embodiments of the present invention. The memory 135 may include, but is not limited to, the following types of devices: cache, ROM, PROM, EPROM, EEPROM, flash, SRAM, and DRAM.

As shown in FIG. 1, the mobile terminal 100 further comprises a signal processor 160 that is responsive to output signals from the microphones 105 and 110 and is configured to generate one or more output signals that are representative of whether the mobile terminal is in a windy environment or in a no-wind environment. In particular, the signal processor may generate cross correlation coefficients for the two microphone signals, which are representative of the spatial correlation of the signals, and autocorrelation coefficients for each of the microphone signals, which are representative of the correlation in time for each of the signals. In general, wind noise is relatively uncorrelated spatially, but relatively correlated in time. In accordance with some embodiments of the present invention, the signal processor 160 is configured to combine spatial correlation of the microphone signals with the time correlation of the microphone signals to generate one or more signals that are indicative of whether the mobile terminal 100 is in a windy environment or a no-wind environment. Exemplary embodiments of the signal processor 160 are described hereafter with respect to FIG. 2.

As shown in FIG. 1, the memory 135 may contain up to two or more categories of software and/or data: the operating system 165 and the wind detection module 170. The operating system 165 generally controls the operation of the mobile terminal. In particular, the operating system 165 may manage the mobile terminal's software and/or hardware resources and may coordinate execution of programs by the processor 140. The wind detection module 170 may be configured to process one or more signals output from the signal processor 160, which indicate whether the mobile terminal 100 is in a windy environment or a no-wind environment, and to adjust the directivity pattern created by the microphones 105 and 110 accordingly.

Although FIG. 1 illustrates an exemplary software and hardware architecture that may be used to detect wind noise in a signal received by an electronic device, such as a mobile terminal, it will be understood that the present invention is not limited to such a configuration but is intended to encompass any configuration capable of carrying out the operations described herein.

Computer program code for carrying out operations of the wind detection program module 165 and/or the signal processor 160 discussed above may be written in a high-level programming language, such as C or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program and/or processing modules may also be implemented using discrete hardware components, one or more application specific integrated circuits (ASICs), or a programmed digital signal processor or microcontroller.

Figure 2:
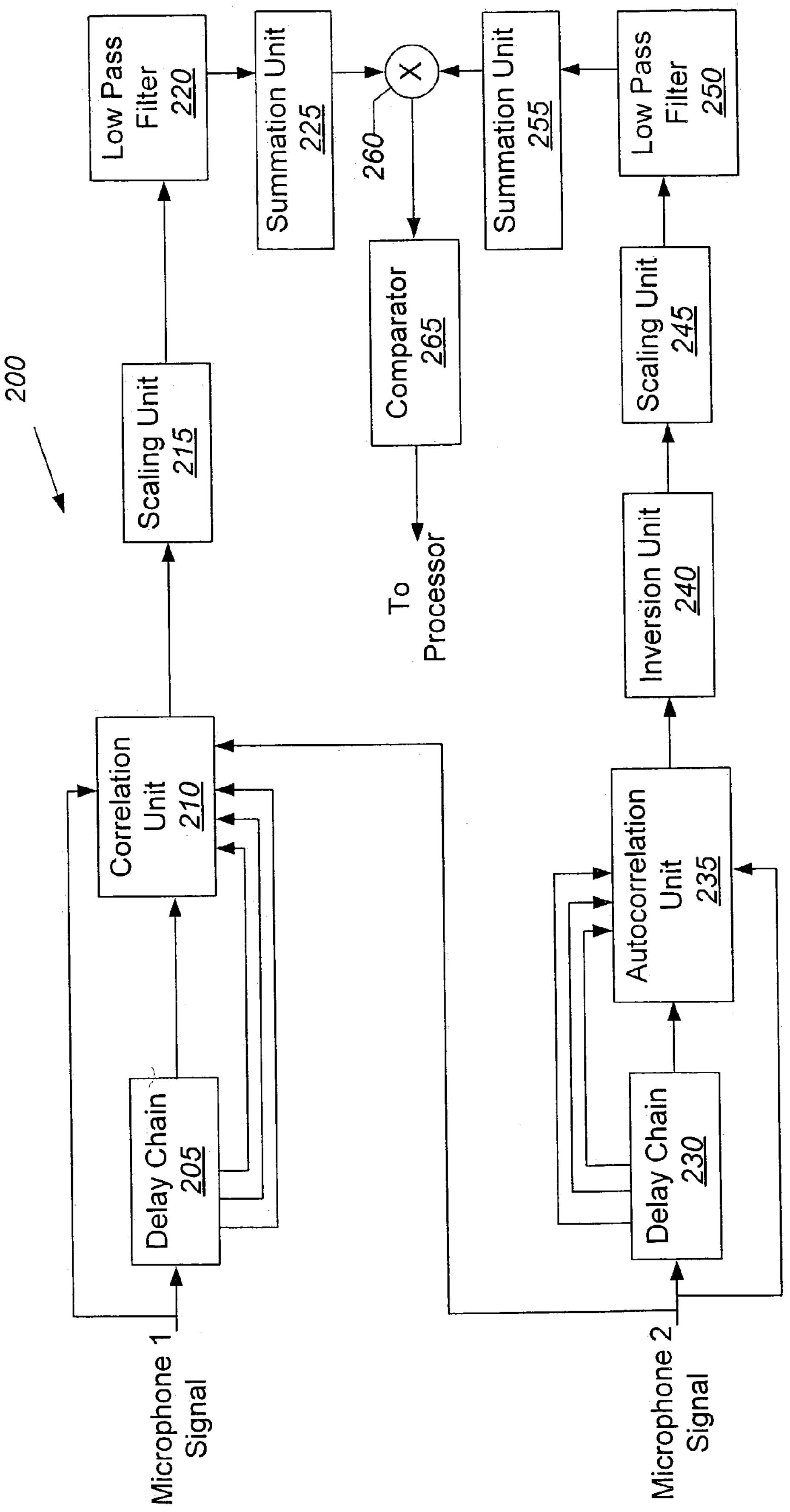
FIG. 2 is a block diagram that illustrates a signal processor that may be used in electronic devices, such as the mobile terminal of FIG. 1, in accordance with embodiments of the present invention.

Referring now to FIG. 2, an exemplary signal processor 200, in accordance with some embodiments of the present invention, that may be used to implement the signal processor 160 of FIG. 1 will now be described. The signal processor 200 comprises a delay chain 205 having N delay elements, a correlation unit 210, a scaling unit 215, a low pass filter 220, and a summation unit 225 that are connected in series to form a system for generating cross correlation coefficients and a spatial correlation sum for two microphone signals, which is representative of the spatial correlation of the signals. The signal processor 200 further comprises a delay chain 230 having N delay elements, an autocorrelation unit 235, an inversion unit 240, a scaling unit 245, a low pass filter 250, and a summation unit 255 that are connected in series to form a system for generating autocorrelation coefficients and an autocorrelation sum for one of the microphone signals, which is representative of the correlation in time of the microphone signal.

The foregoing components of the signal processor 200 will now be described in more detail. The delay chain 205 is responsive to a first microphone signal and generates delayed samples of the first microphone signal (microphone 1 signal), which are provided to the correlation unit 210 along with the original first microphone signal (microphone 1 signal). In particular embodiments, the delay chain 205 may weight the samples, such that newer samples are weighted greater than the older samples. The correlation unit 210 also receives the output signal from a second microphone (microphone 2 signal). If the first microphone signal (microphone 1 signal) is given by $s_1$ and the second microphone signal (microphone 2 signal) is given by $s_2$, and the number of delay elements is N, then the correlation unit 210 generates cross correlation coefficients $R_{12}(\ )$ at lag k according to Equation 1 set forth hereafter:

$$R_{12}(k) = \frac{1}{N-k}\sum_{n=1}^{N-k} s_2(n)s_1(n+k) \qquad \text{EQ. 1}$$

The scaling unit 215 scales the cross correlation coefficients, which are representative of the spatial correlation of the two microphone signals, and the scaled cross correlation coefficients are provided to the low pass filter 220 for smoothing. The low pass filter 220 may be embodied as an autoregressive filter in which the output is based on a weighted sum of previous input values. The summation unit 225 generates a spatial correlation sum by adding the coefficients output from the low pass filter 220.

Similarly, the delay chain 230 is responsive to a second microphone signal (microphone 2 signal) and generates delayed samples of the second microphone signal (microphone 2 signal), which are provided to the autocorrelation unit 235 along with the original second microphone signal (microphone 2 signal). In particular embodiments, the delay chain 230 may weight the samples, such that newer samples are weighted greater than the older samples. If the second microphone signal (microphone 2 signal) is given by $s_2$ and the number of delay elements is N, then the autocorrelation unit 235 generates autocorrelation coefficients $R_{22}(\ )$ at lag k according to Equation 2 set forth hereafter:

$$R_{22}(k) = \frac{1}{N-k}\sum_{n=1}^{N-k} s_2(n)s_2(n+k), \qquad \text{EQ. 2}$$

An inversion unit 240 inverts the autocorrelation coefficients. This is because wind noise is relatively uncorrelated spatially, but relatively correlated in time. Thus, to combine the results from the cross correlation and autocorrelation signal analyses and compare the result with a single threshold, the autocorrelation coefficients are inverted so that a higher correlation will result in lower autocorrelation coefficient values output from the inversion unit 240. The scaling unit 245 scales the autocorrelation coefficients, which are representative of the correlation in time of the second microphone signal, and the scaled autocorrelation coefficients are provided to the low pass filter 250 for smoothing. The low pass filter 250 may be embodied as an autoregressive filter in which the output is based on a weighted sum of previous input values. The summation unit 225 generates an autocorrelation sum by adding the coefficients output from the low pass filter 250.

A multiplication unit 260 is coupled to the two summation units 225 and 255 and multiplies the spatial correlation sum output by the summation unit 225 by the autocorrelation sum output by the summation unit 255 to generate a correlation product. A comparator 265 is coupled to the multiplication unit 260 and compares the correlation product output by the multiplication unit 260 with a threshold value. The result of this comparison is provided to a processor, such as the processor 140 of FIG. 1 where it is then processed by the wind detection module 170 (see FIG. 1).

For purposes of illustration, FIG. 2 illustrates only those components for computing the autocorrelation coefficients and autocorrelation sum for the second microphone signal and the cross correlation coefficients and spatial correlation sum for both the first and second microphone signals. It should be understood that a third set of components corresponding to the autocorrelation unit 235, inversion unit 240, scaling unit 245, low pass filter 250, and summation unit 255 may be provided to cooperate with the delay chain 205 to generate autocorrelation coefficients and an autocorrelation sum for the first microphone signal. Another multiplication unit and comparator, similar to the multiplication unit 260 and the comparator 265 may be used to generate another correlation product based on the autocorrelation sum associated with the first microphone signal and a second comparison result, which is also provided to the processor, such as the processor 140 of FIG. 1. In this manner, the present invention may be extended to embodiments of electronic devices comprising two or more microphones.

Although FIG. 2 illustrates an exemplary software and/or hardware architecture of a signal processor that may be used to detect wind noise in sound waves received by an electronic device, such as a mobile terminal, it will be understood that the present invention is not limited to such a configuration but is intended to encompass any configuration capable of carrying out the operations described herein.

The present invention is described hereinafter with reference to flowchart and/or block diagram illustrations of methods, electronic devices, and computer program products in accordance with some embodiments of the invention. These flowchart and/or block diagrams further illustrate exemplary operations of the mobile terminal and signal processor architectures of FIGS. 1 and 2. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 3:
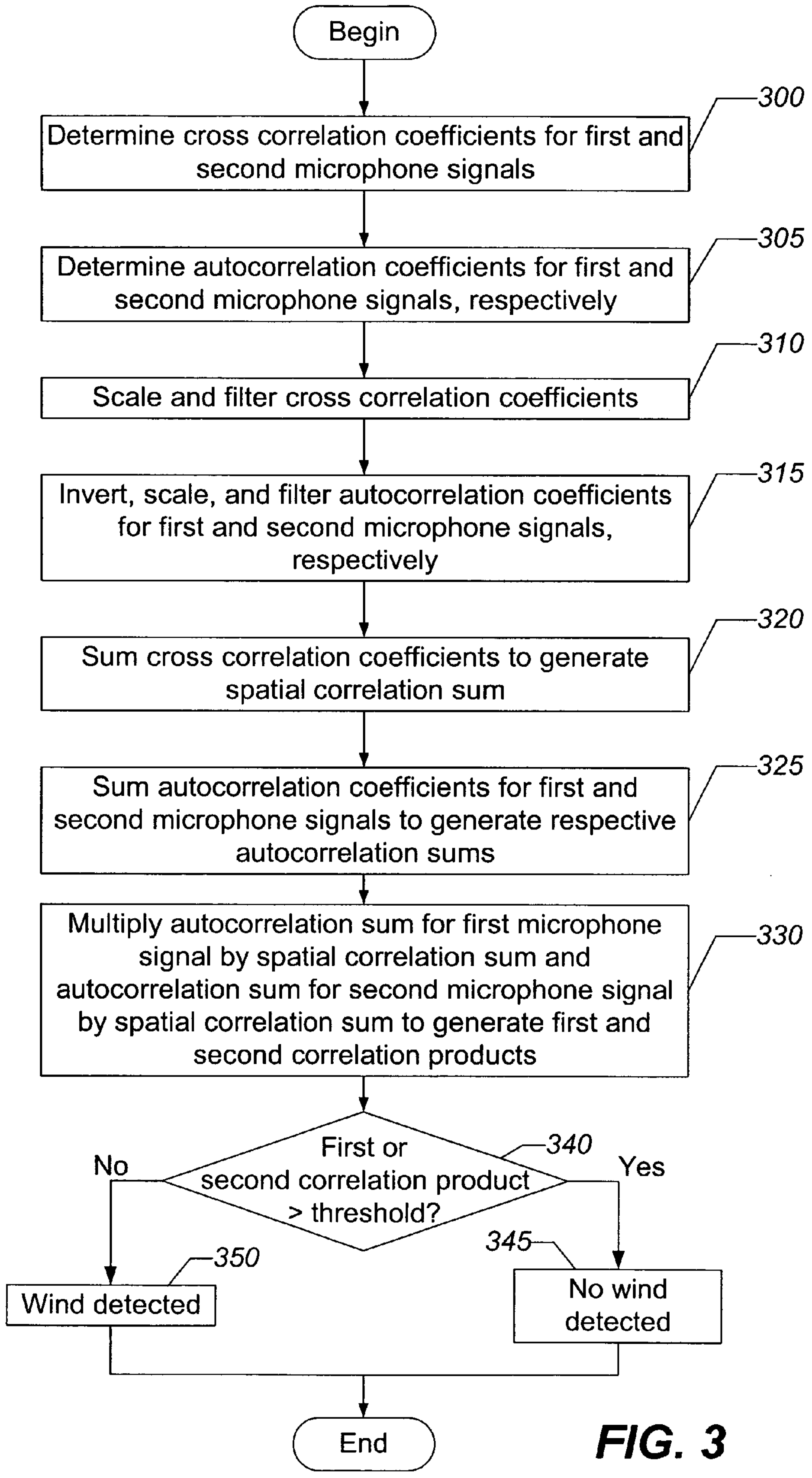
FIG. 3 is a flowchart that illustrates operations for detecting noise in microphone signals in accordance with embodiments of the present invention.

Referring now to FIG. 3, operations begin at block 300 where the cross correlation coefficients for first and second microphone signals, such as signals output from microphones 105 and 110, are determined. At block 305, autocorrelation coefficients are determined for the first and second microphone signals, respectively. The cross correlation coefficients are scaled and filtered at block 310 and the autocorrelation coefficients for the respective first and second microphone signals are inverted, scaled, and filtered at block 315.

The cross correlation coefficients are summed at block 320 to generate a spatial correlation sum and the autocorrelation coefficients are summed at block 325 to generate respective autocorrelation sums for the first and second microphone signals. At block 330, the autocorrelation sum for the first microphone signal and the spatial correlation sum are multiplied together to generate a first correlation product and the autocorrelation sum for the second microphone signal and the spatial correlation sum are multiplied together to generate a second correlation product.

A determination is then made at block 340 whether either of the first or second correlation products exceeds a threshold value. The wind detection module 170 (see FIG. 1) may perform this operation by processing a pair of signals output from the signal processor 160. A first signal corresponds to an output of the comparator 265 of FIG. 2 in which the second correlation product is compared with a threshold value and a second signal corresponds to an output of a second comparator (not shown) in which the first correlation product is compared with the threshold.

If either the first or the second correlation products exceeds the threshold value, then the wind detection module 170 may determine that no wind noise has been detected in the sound waves received by the microphones 105 and 110 at block 345. If, however, neither of the first and second correlation products exceeds the threshold, then the wind detection module 170 may determine that wind noise has been detected in the sound waves received by the microphones 105 and 110 at block 350. In particular embodiments, hysteresis may be used such that wind noise is not detected unless the first and second correlation products exceed the threshold by a predetermined value. Similarly, absence of wind may not be detected after a windy environment has been detected unless the threshold exceeds the first and second correlation products by a predetermined value. The wind detection module 170 may then adjust the directivity pattern created by the microphones 105 and 110 according to whether the mobile terminal 100 is determined to be in a windy environment or in a no-wind environment. Additional signal processing may also be performed to reduce the effects of wind noise if the mobile terminal 100 is determined to be in a windy environment, in accordance with some embodiments of the present invention In other embodiments of the present invention, the wind detection module 170 may determine the presence of wind noise in received sound waves if at least one of the correlation products fails to exceed the threshold, rather than requiring both correlation products to fail to exceed the threshold. In further embodiments, when more than two microphones are used, the wind detection module 170 may determine wind noise is detected if a particular percentage of correlation products fail to exceed the threshold.

Advantageously, embodiments of the present invention use the properties that wind noise is relatively uncorrelated in space, but relatively correlated in time. These two properties may be represented by cross correlation coefficients for multiple microphone signals and autocorrelation coefficients for the individual microphone signals, respectively. Recall that, in addition to wind noise, other noise signals may also be uncorrelated or inverse correlated in space. By combining both a cross correlation coefficient analysis and an autocorrelation coefficient analysis, embodiments of the present invention may detect wind noise with generally improved reliability because the determination is less sensitive to the physics of the microphones.

The flowchart of FIG. 3 illustrates the architecture, functionality, and operations of embodiments of the mobile terminal 100 hardware and/or software. In this regard, each block represents a module, segment, or portion of code, which comprises one or more executable instructions for implementing the specified logical function(s). It should also be noted that in other implementations, the function(s) noted in the blocks may occur out of the order noted in FIG. 3. For example, two blocks shown in succession may, in fact, be executed substantially concurrently or the blocks may sometimes be executed in the reverse order, depending on the functionality involved.

Many variations and modifications can be made to the preferred embodiments without substantially departing from the principles of the present invention. All such variations and modifications are intended to be included herein within the scope of the present invention, as set forth in the following claims.

I claim:

1. A method of operating an electronic device, comprising:

generating a first microphone signal via a first microphone;

generating a second microphone signal via a second microphone;

determining cross correlation coefficients for the first and the second microphone signals;

determining first autocorrelation coefficients for the first microphone signal;

determining second autocorrelation coefficients for the second microphone signal;

summing the cross correlation coefficients to generate a spatial correlation sum;

summing the first autocorrelation coefficients to generate a first autocorrelation sum;

summing the second autocorrelation coefficients to generate a second autocorrelation sum;

multiplying the first autocorrelation sum by the spatial correlation sum to generate a first correlation product:

multiplying the second autocorrelation sum by the spatial correlation sum to generate a second correlation product; and determining the presence of a noise component of at least one of the first and second microphone signals based on the first and/or second correlation products.

2. The method of claim 1, further comprising:

adjusting a directivity pattern created by the first and second microphones based on the presence of the noise component.

3. The method of claim 1, wherein determining the presence of the noise component based on the first and second correlation products, comprises:

comparing the first correlation product with a threshold value;

comparing the second correlation product with the threshold value; and determining if the audio signal comprises the noise component based on at least one of the first and the second correlation products differing from the threshold value by a predetermined value.

4. The method of claim 1, further comprising wherein generating the spatial correlation sum, the first autocorrelation sum, and the second autocorrelation sum is preceded by:

scaling the cross correlation coefficients;

filtering the scaled cross correlation coefficients;

inverting the first and second autocorrelation coefficients;

scaling the inverted first and second autocorrelation coefficients; and filtering the scaled first and second autocorrelation coefficients.

5. The method of claim 1, wherein the electronic device comprises a mobile terminal.

6. The method of claim 1, wherein the noise is wind noise.

7. An electronic device, comprising:

a first microphone that is configured to generate a first microphone signal;

a second microphone that is configured to generate a second microphone signal;

a correlation unit that is configured to generate cross correlation coefficients responsive to the first and second microphone signals;

a first autocorrelation unit that is configured to generate first autocorrelation coefficients responsive to the first microphone signal;

a second autocorrelation unit that is configured to generate second autocorrelation coefficients responsive to the second microphone signal;

a first summation unit that is configured to generate a spatial correlation sum responsive to the cross correlation coefficients;

a second summation unit that is configured to generate a first autocorrelation sum responsive to the first autocorrelation coefficients;

a third summation unit that is configured to generate a second autocorrelation sum responsive to the second autocorrelation coefficients;

a first multiplication unit that is configured to generate a first correlation product responsive to the first autocorrelation sum and the spatial correlation sum;

a second multiplication unit that is configured to generate a second correlation product responsive to the second autocorrelation sum and the spatial correlation sum; and a processor that is configured to determine the presence of a noise component of at least one of the first and second microphone signals responsive to the first and/or second correlation products.

8. The electronic device of claim 7, wherein the processor is further configured to adjust a directivity pattern created by the first and second microphones based on the presence of the noise component.

9. The electronic device of claim 7, further comprising:

a first comparator that is configured to generate a first output signal responsive to the first correlation product and a threshold value;

a second comparator that is configured to generate a second output signal responsive to the second correlation product and the threshold value; and wherein the processor is further configured to determine the presence of the noise component responsive to at least one of the first and the second output signals.

10. The electronic device of claim 7, further comprising:

a first scaling unit and a first filter that are coupled in series between the correlation unit and the first summation unit and being responsive to the cross correlation coefficients;

a first inversion unit, a second scaling unit, and a second filter that are coupled in series between the first autocorrelation unit and the second summation unit and being responsive to the first autocorrelation coefficients; and a second inversion unit, a third scaling unit, and a third filter that are coupled in series between the second autocorrelation unit and the third summation unit and being responsive to the second autocorrelation coefficients.

11. The electronic device of claim 7, further comprising:

a first delay element chain coupled between the first microphone and the correlation unit that is configured to generate a first plurality of delayed signal samples responsive to the first microphone signal, the correlation unit being responsive to the first plurality of delayed signal samples and the second microphone signal; and a second delay element chain coupled between the second microphone and the second autocorrelation unit that is configured to generate a second plurality of delayed signal samples responsive to the second microphone signal, the second autocorrelation unit being responsive to the second plurality of delayed signal samples.

12. The electronic device of claim 11, wherein the first delay element chain is configured to weight newer ones of the first plurality of delayed signal samples greater than older ones of the first plurality of delayed signal samples, and wherein the second delay element chain is configured to weight newer ones of the second plurality of delayed signal samples greater than older ones of the second plurality of delayed signal samples.

13. The electronic device of claim 7, wherein the electronic device comprises a mobile terminal.

14. The electronic device of claim 7, wherein the noise is wind noise.

15. An electronic device, comprising:

means for generating a first microphone signal;

means for generating a second microphone signal;

means for determining cross correlation coefficients for the first and the second microphone signals;

means for determining first autocorrelation coefficients for the first microphone signal;

means for determining second autocorrelation coefficients for the second microphone signal;

means for summing the cross correlation coefficients to generate a spatial correlation sum;

means for summing the first autocorrelation coefficients to generate a first autocorrelation sum;

means for summing the second autocorrelation coefficients to generate a second autocorrelation sum;

means for multiplying the first autocorrelation sum by the spatial correlation sum to generate a first correlation product;

means for multiplying the second autocorrelation sum by the spatial correlation sum to generate a second correlation product; and means for determining the presence of a noise component of at least one of the first and second microphone signals based on the first and/or second correlation products.

16. The electronic device of claim 15, further comprising:

means for adjusting a directivity pattern created by the first and second microphones based on the presence of the noise component.

17. The electronic device of claim 15, wherein the means for determining the presence of the noise component based on the first and second correlation products, comprises:

means for comparing the first correlation product with a threshold value;

means for comparing the second correlation product with the threshold value; and means for determining the presence of the noise component based on at least one of the first and the second correlation products differing from the threshold value by a predetermined value.

18. The electronic device of claim 15, further comprising:

means for scaling the cross correlation coefficients;

means for filtering the scaled cross correlation coefficients;

means for inverting the first and second autocorrelation coefficients;

means for scaling the inverted first and second autocorrelation coefficients; and means for filtering the scaled first and second autocorrelation coefficients;

the means for summing the cross correlation coefficients being responsive to the means for filtering the scaled cross correlation coefficients, and the means for summing the first autocorrelation coefficients, and means for summing the second autocorrelation coefficients being responsive to the means for filtering the scaled first and second autocorrelation coefficients.

19. The electronic device of claim 15, wherein the electronic device comprises a mobile terminal.

20. The electronic device of claim 15, wherein the noise is wind noise.

21. A computer program product configured to operate an electronic device, comprising:

a computer readable storage medium having computer readable program code embodied therein, the computer readable program code comprising:

computer readable program code for generating a first microphone signal;

computer readable program code for generating a second microphone signal;

computer readable program code for determining cross correlation coefficients for the first and the second microphone signals;

computer readable program code for determining first autocorrelation coefficients for the first microphone signal;

computer readable program code for determining second autocorrelation coefficients for the second microphone signal;

computer readable program code for summing the cross correlation coefficients to generate a spatial correlation sum;

computer readable program code for summing the first autocorrelation coefficients to generate a first autocorrelation sum;

computer readable program code for summing the second autocorrelation coefficients to generate a second autocorrelation sum;

computer readable program code for multiplying the first autocorrelation sum by the spatial correlation sum to generate a first correlation product;

computer readable program code for multiplying the second autocorrelation sum by the spatial correlation sum to generate a second correlation product; and computer readable program code for determining the presence of a noise component of at least one of the first and second microphone signals based on the first and/or second correlation products.

22. The computer program product of claim 21, further comprising:

computer readable program code for adjusting a directivity pattern created by the first and second microphones based on the presence of the noise component.

23. The computer program product of claim 21, wherein the computer readable program code for determining the presence of the noise component based on the first and second correlation products, comprises:

computer readable program code for comparing the first correlation product with a threshold value;

computer readable program code for comparing the second correlation product with the threshold value; and computer readable program code for detenning the presence of the noise component based on at least one of the first and the second correlation products differing from the threshold value by a predetermined value.

24. The computer program product of claim 21, further comprising:

computer readable program code for scaling the cross correlation coefficients;

computer readable program code for filtering the scaled cross correlation coefficients;

computer readable program code for inverting the first and second autocorrelation coefficients;

computer readable program code for scaling the inverted first and second autocorrelation coefficients; and computer readable program code for filtering the scaled first and second autocorrelation coefficients;

the computer readable program code for summing the cross correlation coefficients being responsive to the computer readable program code for filtering the scaled cross correlation coefficients, and the computer readable program code for summing the first autocorrelation coefficients, and computer readable program code for summing the second autocorrelation coefficients being responsive to the computer readable program code for filtering the scaled first and second autocorrelation coefficients.

25. The computer program product of claim 21, wherein the noise is wind noise.

* * * * *